(12) United States Patent
Calder et al.

(10) Patent No.: US 8,504,416 B2
(45) Date of Patent: *Aug. 6, 2013

(54) METHOD FOR ONLINE SESSION ADVERTISING

(75) Inventors: Craig V. Calder, Maplewood, NJ (US); Heather Keltz, Maplewood, NJ (US)

(73) Assignee: The New York Times Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,052

(22) Filed: May 23, 2012

(65) Prior Publication Data

US 2012/0323705 A1    Dec. 20, 2012

Related U.S. Application Data

(63) Continuation of application No. 10/653,942, filed on Sep. 4, 2003, now Pat. No. 8,195,508, which is a continuation of application No. 10/180,087, filed on Jun. 27, 2002, now abandoned.

(51) Int. Cl.
*G06Q 30/00* (2012.01)

(52) U.S. Cl.
USPC ........................................ 705/14.1

(58) Field of Classification Search
USPC ........................................ 705/14.1
See application file for complete search history.

(56) References Cited

U.S. PATENT DOCUMENTS

| | | | |
|---|---|---|---|
| 5,099,422 A | 3/1992 | Foresman et al. | |
| 5,347,632 A | 9/1994 | Filepp et al. | |
| 5,937,392 A | 8/1999 | Alberts | |
| 5,948,061 A | 9/1999 | Merriman et al. | |
| 6,014,502 A | 1/2000 | Moraes | |
| 6,026,368 A | 2/2000 | Brown et al. | |
| 6,061,659 A | 5/2000 | Murray | |
| 6,161,127 A | 12/2000 | Cezar et al. | |
| 6,285,987 B1 | 9/2001 | Roth et al. | |
| 6,314,451 B1 | 11/2001 | Landsman et al. | |
| 6,339,761 B1 | 1/2002 | Cottingham | |
| 6,341,305 B2 | 1/2002 | Wolfe | |
| 6,601,041 B1 | 7/2003 | Brown et al. | |
| 8,195,508 B1 * | 6/2012 | Calder et al. | 705/14.1 |
| 2001/0039510 A1 | 11/2001 | Galomb | |
| 2002/0002491 A1 | 1/2002 | Whitfield | |

FOREIGN PATENT DOCUMENTS

WO    9721183 A1    6/1997

OTHER PUBLICATIONS

Meskauskas, J., "Alternative Metrics: The Session", Complimentary White Paper, Aug. 29, 2000, 2 pages.
Meskauskas, J., "Jam Sessions", Complimentary White Paper, Oct. 23, 2001, 1 page.

* cited by examiner

*Primary Examiner* — Daniel Lastra
(74) *Attorney, Agent, or Firm* — Rothwell, Figg, Ernst & Manbeck, P.C.

(57) ABSTRACT

The invention provides a method of providing and selling online advertising in which a single advertiser is guaranteed major advertising locations on each qualifying page viewed by a web site visitor during the viewer's entire web session. Advertisements from a single advertiser follow web site visitors through the web pages they select for viewing, allowing a consistent message to be displayed to a particular user over a period of time. Advantages include the ability to engage in linear storytelling and to obtain reach, duration, and impact of the advertising message on a par with or exceeding that obtainable from conventional advertising media such as television and print.

18 Claims, 3 Drawing Sheets

METHOD FOR ONLINE SESSION ADVERTISING

CROSS REFERENCE TO RELATED APPLICATIONS

This application is a continuation of U.S. application Ser. No. 10/653,942, filed Sep. 4, 2003 (now U.S. Pat. No. 8,195,508), which is a continuation of application Ser. No. 10/180,087, filed on Jun. 27, 2002 (now abandoned). All of the above referenced applications and patents are incorporated herein by this reference.

BACKGROUND OF THE INVENTION

1. Technical Field

This invention pertains to the field of online advertising. In particular, the invention provides a method for providing an advertiser with exclusive placement on multiple web pages viewed by a particular web site visitor and the ability to purchase advertising in units of user sessions. The method also optionally gives advertisers an opportunity to select the web pages where the advertisements will be viewed and to select the visitors who will view the advertisements.

2. Description of the Background Art

Advertising on the Internet typically involves fixed position advertising regions, commonly known as banners, skyscrapers and the like, which appear on the browser page of the user when information on a web page requested by the user is viewed. In most cases, the content is fixed so that all viewers of that web page view the same advertisement on the same location of the web page as displayed by the user's browser. Typically, multiple advertisers display advertisements on the same page.

In most cases, an advertiser supplies advertising copy to the operator of a web site and the advertising is displayed on the pages of the web site. The web pages then are viewed by users accessing the web site. Typically, the advertiser cannot choose the pages or subject areas where the advertisements will appear, nor can the advertiser otherwise target the users that are most desirable. The advertiser has little or no control over how the particular advertising content is viewed by the user or whether the content is even visible on the page due to scrolling by the user. Some advertisements may not be viewed at all by the user; some may be viewed or visible for only a very short period of time. Thus the duration of the advertisement viewed is not possible to control or quantitate, and the reach of the advertising can not be measured.

Measuring the impact and reach of conventional online advertising is difficult using current methodologies. Primarily, traditional online fixed advertisements have very low response (or "click-through") rates. In addition, a web page typically contains different advertisements from two or more advertisers, each competing for the attention of the user. This practice results in clutter on the page and makes it even more difficult for each advertiser to calculate the reach and consequently the value of the advertising they have purchased. Also, it is very difficult to determine how long or how often a user actually views an advertisement or to otherwise gauge the effectiveness of the advertising. Consequently, advertisers may be reluctant to purchase conventional online advertising or to pay more than relatively low amounts for the advertising. The difficulty in quantitating the reach and frequency of conventional online banner or other fixed position advertising in the manner familiar to purchasers of traditional advertising such as print media, television and radio advertising also has made traditional brand advertisers disinclined to advertise online.

Traditional broadcast and print advertisement pricing is generally based on measurements such as the demographics of the audience and the number of viewers or subscribers. Online advertising usually has been sold based on "clicks," page views or "impressions." Each of these selling units has disadvantages. Impressions measure the number of times that a particular advertisement is displayed on a web page to viewers, while page views measure the number of times that a particular web page is viewed. Neither reveals whether the same advertisement or page has been displayed several times to the same user or to multiple users. As a result, impressions or page views currently are recognized as poorly correlated to actual audience reach and have limited meaning to advertisers.

The number of times viewers select an advertisement ("click-throughs") supposedly provides a truer measure of response to the advertisement. But users increasingly view online advertising but do not click-through to receive more information about the products and/or services being offered. Studies show that the average rage of click-throughs to banner-type advertisements generally has diminished over time. Using a click model for basing pricing also underestimates the impact an advertisement may have on a web site visitor who does not click on the advertisement but nevertheless may have an increased awareness and favorable opinion of the advertised subject matter. Therefore, since the web site cannot accurately measure the impact of the advertising message that it sells, it cannot charge a price that takes this impact into account. Moreover, a model based on the number of clicks does not take into account the quality or demographics of the audience being reached.

Many traditional advertisers also find it difficult to compare and contrast impressions, page views, or click-throughs with the measurements used in other forms of advertising with which they are familiar, such as television commercials or traditional print advertisements. Judging the intrinsic value of such advertising in terms familiar to purchasers of advertising also has been difficult. Web publishers know that online advertising builds brands effectively and produces valuable results. However, advertisers clearly need another way of viewing and measuring whether their message is reaching its desired audience and effectively building brand awareness.

As viewer response to banners or to fixed positions online advertising has decreased, spending on online advertising also has leveled off. In an attempt to boost sales of advertising on the web, some publishers have introduced new formats, such as pop-up or pop-under ads. Critics say that these larger and more intrusive advertisements leave the target audience with a negative rather than positive impression of both the advertiser and the web site.

Other methods of presenting advertising messages online to better capture the web site visitor's attention have been attempted. For example, United States Published Patent Application US2002/0002491 A1 discloses a method for rotating banners through a series of advertisements. This method includes a method for determining whether the user has not viewed any advertisements in the series and if an advertisement has been viewed, the next advertisement in the series is displayed or an advertisement matching the user's demographic profile is used. This method, among other things, does not, however, overcome the disadvantage of web page clutter or permit measurement of frequency and/or reach to a particular user during a web session. Nor does the method allow a single advertiser to exclusively control the major advertisement positions over a series of web pages.

U.S. Pat. No. 6,161,127 describes a non-scrolling frame where advertisements can be displayed sequentially to web site visitors. These advertisements have the advantage that the end user cannot scroll the frame so that it ceases to be visible, and the frame system allows advertisements to be displayed sequentially over different page views of a web session. This method, however, does not discuss exclusive advertising within the entire web page.

Because of the above problems associated with conventional online advertising methods, there is a need in the art for a method to sell and display advertising which overcomes these difficulties and uncertainties and provides an improved method of measuring advertising effectiveness.

SUMMARY OF THE CLAIMS

Accordingly, the present invention provides a method for displaying a series of advertisements by a single advertiser which may tell a story to engage the user's attention, deployed on successive pages of an exclusive web session.

In one embodiment, the invention provides an online session advertising method for displaying advertisements from an advertiser to a web site visitor having a computer with a display, a selecting device, a hard drive and internet capability, which comprises (a) maintaining an ad server having a database of advertisements from said advertiser, wherein said advertisements are grouped in at least two sequentially numbered campaigns to be sequentially displayed to said web site visitor in a session which comprises a predetermined minimum number of at least two web pages selected for viewing by said web site visitor and wherein each of said advertisements is associated with one or more of said sequentially numbered campaigns; (b) said web site visitor entering said web site and selecting a first web page to view; (c) displaying to said web site visitor the first of said sequentially numbered campaigns on said first web page; (d) said web site visitor selecting a next web page to view; (e) displaying to said web site visitor the next of said sequentially numbered campaigns on said web page, wherein the next numbered campaign to be displayed is determined by the value to which said session cookie is incremented; and (f) repeating steps (d)-(e) until said predetermined number of sequential qualifying web pages have been selected for viewing by said web site visitor; wherein said qualifying web page selected for viewing by said web site visitor is a web page in which there are no pre-scheduled fixed advertisements in any major ad position, in which there is at least one major ad position and which is located within the domain of said web site. In another embodiment, the invention provides a method as described above which further comprises, between steps (c) and (d) issuing a session cookie to the hard drive of said web site visitor's computer, wherein said cookie is incremented to a value that indicates that said first of said sequentially numbered campaigns have been displayed; and between steps (e) and (f) incrementing said session cookie to a value that indicates that the next of said sequentially numbered campaigns have been displayed.

Preferably, in the inventive methods there are no pre-scheduled fixed advertisements in any major ad position and in which there are at least major ad positions selected from the group consisting of (1) a big ad and (2) top and bottom banner ads and a skyscraper ad. Preferably, the predetermined minimum number of web pages may be about 2 to about 20, about 3 to about 10, about 3 to about 8, or about 5. Methods also may comprise a predetermined maximum number of sequential web pages. The first web page may be the home page of the web site or a web page selected from the home page of the web site by the web site visitor. The content of the advertising campaigns may be based on the subject matter of the first web page or on information contained in a cookie stored on the hard drive of said web site visitor.

In a further embodiment, the invention provides a method of selling online advertising which comprises selling advertising in units of a predetermined minimum number of online advertisements that are sequentially displayed to a web site visitor on sequentially viewed web pages, wherein said predetermined minimum number is 2 or greater.

In yet a further embodiment, the invention provides an online advertising product for display to a web site visitor which comprises a predetermined minimum number of groups of online advertisements that are sequentially displayed to a web site visitor on sequentially viewed web pages, wherein said predetermined minimum number is 2 or greater.

In yet a further embodiment, the invention provides a method of providing a sequence of sequentially numbered advertisement campaigns of an advertiser to individual viewers of an Internet web site, which comprises the steps of (a) receiving a request for display of a web page of said web site; (b) identifying the requestor of said web page; (c) retrieving a first numbered advertisement campaign of said sequentially numbered advertisement campaigns and inserting said first numbered advertisement campaign into said requested web page; (d) serving said requested web page to said requestor; (e) determining when said requestor requests an additional web page from said web site; (f) retrieving a next advertisement campaign of said sequentially numbered advertisement campaigns and inserting said next advertisement campaign into said additional requested web page; and (g) serving said additional web page to said requester. This method also may which further comprise between steps (d) and (e) issuing a cookie to the hard drive of said requestor wherein said cookie is incremented to a value that indicates said first advertisement campaign has been served to said requestor; and after step (g) incrementing said cookie to indicate said next advertisement campaign has been served to said requestor.

DETAILED DESCRIPTION OF THE PREFERRED EMBODIMENTS

Figure 1:
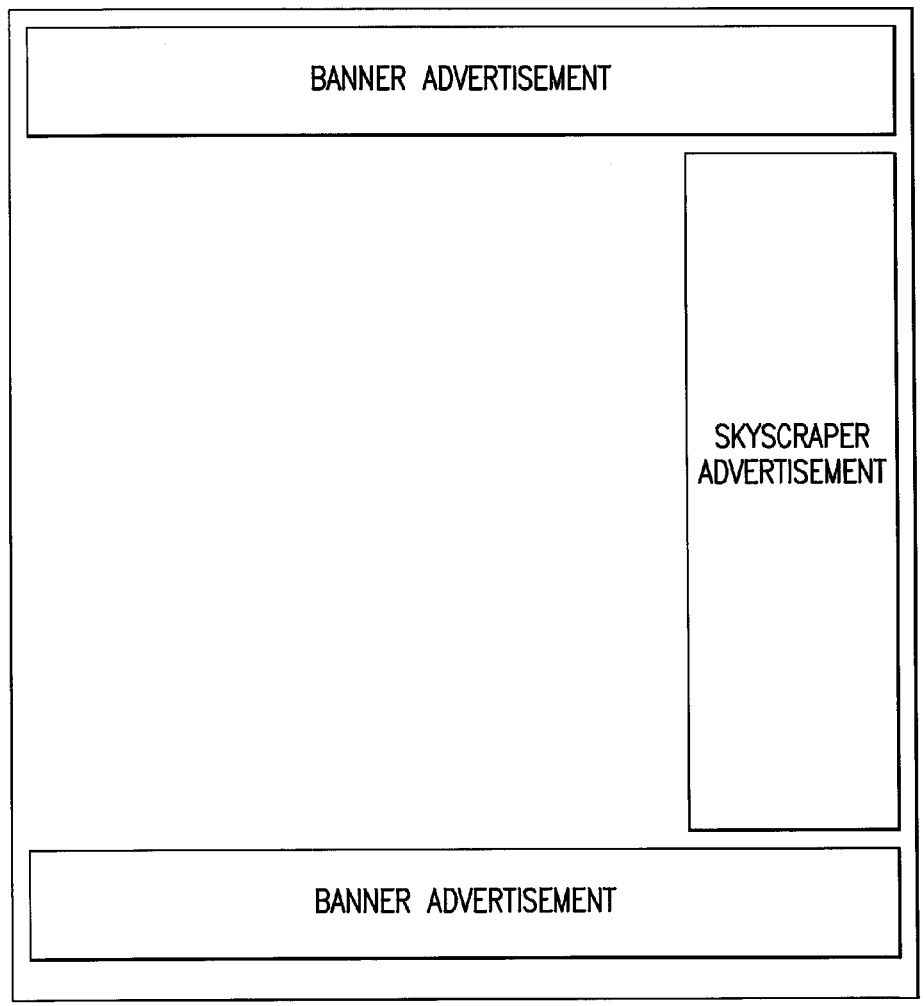
FIG. 1 shows exemplary placement of banner and skyscraper advertisements.

The inventive method enables an advertiser to follow a single individual user through his/her entire visit to a web site without competition from other advertisers. This visit to a site, termed a Session, may consist of visits to two or more qualifying web pages on the web site, up to, for example, 5, 10, 20 pages or an indefinite number of web pages. The client obtains the right to exclusive use of the advertising space on all of the pages of the Session so that no other advertisers or products/services compete with the client on any of the pages. The exclusive advertisements follow the user through the web site visit, from page to page, whatever path through the site the user chooses and on whatever qualifying pages the user chooses to view, "surrounding" the site visitor. The preferred embodiment of the inventive method, wherein a single advertiser purchases exclusive rights to the web Session, is termed a Surround Session™. This allows the advertiser to present exclusive multi-tiered messages to a web site visitor that can tell a story. Through both exclusivity and repetition of the advertiser's message, the inventive method provides a high quality advertising product. Marketers also can obtain a greater degree of branding value as the site visitor views successive pages and the duration of and exposure to the advertising message increases. The total viewing time of the advertising message can approach or exceed that of other advertising media.

Some of the key benefits of the inventive method to the advertiser are the ability to "own" rights to a web site viewer's entire site session; high frequency and duration of placement before the viewer; placement in all major advertisement positions on every page visited in the Session; the availability of contextual, demographic and behavioral targeting; the ability to measure branding metrics; and excellent value. In addition, by allowing advertisers to purchase advertising in units of web user Sessions rather than the conventional units of impressions or clicks, the invention provides a more convenient and more quantitatable index by which the value of the advertising can be measured and compared to other, more conventional advertising methods.

In addition, with most traditional online advertising systems, an advertiser wishing to view the advertisements as they appear in the site online must visit the web site as an ordinary site visitor does and search for the advertisement. Many times it is very difficult to find the advertisement on the site, causing inconvenience and annoyance to the advertiser. With the inventive method, a Sessions advertiser may be given an address (an anchor URL) which enables him to view the purchased Session or Sessions on demand. This way, the advertiser is able to see exactly what the target audience is seeing, much like a television or print advertisement. This feature can greatly increase the value of the advertising product over prior art methods.

In an alternative embodiment, the advertiser may purchase a single guaranteed major position per Session page rather than exclusive use of all pages in a session. The advertiser using this alternative method of session advertising would receive the benefit of repetition and story telling ability and the ability to quantitate reach to a particular target audience, but because the advertisements are not exclusive to each page, would be able to pay a lower price.

The term "Session," as used herein is defined as a visit to a particular web site by a user at a remote location in which the user views at least a predetermined minimum number of qualifying web pages containing advertisements exclusively (or in the alternative embodiment, a single guaranteed major position on each successive web page) from a single advertiser ("Session pages"). Qualifying web pages are defined according to predetermined criteria (such as on all international news pages, or on all pages featuring stories on golf, for example) as desired by the advertiser and/or the web publisher selling the advertising. Each Session page may contain any predetermined size or quantity of advertising, however each page, to qualify, must contain no major advertisement positions occupied by advertising other than that provided by the entity who has purchased the Session. The advertiser purchasing a Session thus is guaranteed that each Session with a user will provide maximum impact, with exclusive advertising rights to a minimum number of pages, each of which has a predefined minimum quantity and size of advertising space. Preferably, a qualifying page will contain at least top and bottom banners and a skyscraper, a big ad and/or a big ad and a banner. The advertisement or advertisements grouped together or a single Session page are termed a "campaign" for purposes of this specification. Thus a Session is composed of a plurality of (at least two) campaigns.

In a preferred embodiment, if a viewer visits a web site and begins a Session, but exits the site before viewing the minimum number of qualifying Session pages, the viewer would not have completed a session and advertiser would not be charged. The advertiser thus receives a "bonus" of pages and advertisements viewed without charge. In addition, if the viewer visits more than the minimum number of pages which define the Session, the additional pages are delivered at no additional cost to the advertiser.

In one embodiment of the invention, a Session may be defined to include all qualifying web pages with Session advertisements viewed by a particular user within any convenient predetermined time period, such as 24 hours, 48 hours, 72 hours, one week, two weeks or one month. Thus, single Session (a "divided" Session) can occur over two or more separate visits to the same web site within a predetermined period of time. In this case, a Session may last as long as the defined period of time or until a predetermined number of pages is reached. The Session can be automatically terminated once a predetermined maximum number of Session pages is reached, or can continue for the entire defined time period. In this embodiment of the invention, therefore the Session is not necessarily terminated when the user exits the site. The Session can be resumed when the user reenters the site within the predetermined time period and may continue over several separate visits to the web site. Thus, the user may visit a web site and begin a Session, but exit the web site after viewing less than the minimum number of pages, resuming and completing the Session at a later visit to the web site by selecting further qualifying pages for viewing. In addition, multiple web sites may be linked so that divided Sessions can be shared among two or more linked web sites for which the advertiser has purchased Sessions advertising. If multiple sites are linked, the advertiser can follow a specific user to different sites.

Within each campaign, the banner and skyscraper advertisements preferably appear together on a single page and larger format advertisements to appear alone or with a banner on a single page. However a Session may be configured to combine any number, format and size of advertisements on each page. Preferably, each qualifying web page will contain at least one banner and one skyscraper advertisement, or at least two banner advertisements, or at least one larger advertisement. Most preferably, a qualifying page contains at least one larger advertisement or a skyscraper surrounded by top and bottom banners.

An advertiser provides advertising blocks in different sizes and forms for placement on different web pages on the web site such as banner, skyscraper, buttons, text links or big ad formats including rectangles, squares or other configurations, as defined by the Interactive Advertising Bureau (IAB), which specifies standards for the online advertising industry. Any or all of the advertisements may contain rich media or links to audio, visual or other kinds of enhanced content. Although the advertising dimensions can be customized for each session page, most advertisements will be displayed in standard sizes such as those described by the IAB, some examples of which are shown in Table 1, below. Typical advertisement sized may be, for example, about 350 to about 600×about 40 to about 80 pixels or preferably about 400 to about 500×about 50 to about 70 pixels for a banner advertisement, and most preferably about 468×60 pixels. Skyscraper advertisements also may be of any convenient size, for example about 100 to about 200×about 400 to about 1200 pixels or preferably about 140 to about 180×about 700 to about 900 pixels, or preferably about 160×800 pixels. Big ad format advertisements may be of any size which can conveniently fit onto the web page being viewed by the user, and may be square or rectangular, or any desired shape. For example, such advertisements may be about 200 to about 500×about 400 to about 1200 pixels, up to the entire page of the web site. Preferred big ad units are about 300 to about 400×about 700 to about 900 pixels, or most preferably about 336×800 pixels. Thus, in general, preferred advertisement sizes include, but are not limited to: 86×40, 86×60, 88×31, 100×500, 120×60, 120×90, 140×200, 140×600, 140×800, 160×200, 160×600, 160×800, 184×25, 184×90, 240×400, 336×280, 400×300, 468×60, 640×400, 669×25 and 768×60. Most preferred advertisement sizes include those listed in Table 1. See also FIG. 1.

TABLE 1

Most Preferred Advertisement Sizes and Locations.

| Ad Name | Location | Dimensions (pixels) | Maximum File Size |
|---|---|---|---|
| Banner | Top & Bottom Top & Middle Middle | 468 × 60 | 20K |
| Skyscraper | Right Side Left Side | 140-160 × 200-800 | 20K |
| Big Ad | Any Location on Page | 336 × 280 240 × 400 | 50K |
| Partner Box | Any Location on Page | 184 × 90 | 15K |
| Site-for-a-Day | Left Side Bottom Left | 86 × 60 | 10K |

The inventive online advertizing method features presentation of sequential advertizing by a single advertiser over a user's entire viewing session. This method allows an advertiser to create copy which tells a linear story line or a multi-faceted message which can follow a user from page to page of a visit to a web site. In addition, the method allows an advertiser to engage the user with an uninterrupted, all-encompassing advertising experience which flows across several web pages. The advertiser enjoys prominent placement on each page of the Session, benefitting from repetition of the desired message, which leads to greater response from the targeted audience. Even as the user visits multiple web pages, the advertiser avoids having to compete for the user's attention with other advertisers either within pages of the Session or during the entire Session. The advertiser therefore gains increased frequency and duration in presenting its advertising message to each user. These factors result in a greater ability both to build brand recognition and a greater likelihood for direct response to the advertisement. Further, the more time a user spends viewing a particular advertising message, the more weight it is likely to have on the viewer, and the more an advertisement can tell a story that makes an impression on the viewer, the more effective it will be.

The same or different advertisements can be used on multiple pages in the same Session. Preferably different advertisements or different combinations of advertisements are displayed on each page in the Session. In a preferred embodiment, a unique sequence of campaigns is created so that each page view of the Session is displayed to the viewer in a particular order. Advantageously, advertisements in multiple sizes, for example banner, skyscraper and big ad sizes, may be scheduled into each campaign for each discrete page view level of the session. The total number of advertisements viewed in each Session will vary depending on the path chosen by the user and the number of pages viewed. For reporting purposes when billing the advertiser, the campaigns may be named in a common format and associated together as a single campaign group representing the full Session. A specially designed campaign management system controls the display and timing of the advertisements in a Session within the desired parameters. The campaign management system is a tool which is preferably used to schedule advertisements and the parameters for their delivery. Within this system, each page view within a Session or a Surround Session is delivered by its own unique campaign name, allowing specific advertisements to be delivered at each individual page view level. In a preferred embodiment, each campaign of the Session contains at least a top and bottom banner and a skyscraper, or a single big ad.

The types of advertising which may be used with the inventive method and system are unlimited. For example, brand or image-based advertising, advertorials, displayed advertising, classified or information-based advertising, interactive or animated advertising, sales-oriented advertising telling the user where to go to order or purchase the particular goods and/or services, or any other type of advertising may be used, alone or in combination, within a Session or in different sessions. As will be seen readily by one of skill in the art, any ad copy may be displayed using the inventive advertising methods. Advertising designed to supplement or complement other advertising campaigns in other media such as print or television may be used. In one embodiment of the invention, for example, advertisements aimed at provoking both brand recognition and purchasing may be combined effectively since the Session concept involves repetition of multiple messages to the target audience over a period of time. Rich media ads are particularly useful in Session advertising, including interactive ads. Animated ads with richer content may enhance the effectiveness of the advertising sequence. Sequential advertisements take full advantage of the inventive methods by telling a story which can capture the viewers attention as the advertisements appear on sequential pages.

The advertisement Session optionally may be preset with both minimum and maximum numbers of pages, but always contains a predetermined minimum number of qualifying pages. For example, a session may be defined as containing at least 2 pages and no more than 20 pages. Any convenient number of qualifying pages may make up a Session for the purposes of this advertising method, depending upon the type of web site, the number of pages generally viewed by users of the web site, or the type of advertising campaigns desired by the advertiser. The person of skill can readily see that the number of pages defining a Session could readily be predetermined to be any convenient number of 2 or greater. In preferred embodiments, a Session is defined as a minimum of about 3-10 or about 3-8 qualifying Session pages. Most preferably, a Session is defined as a minimum of 5 pages. If a maximum number of pages is set to end a Session, the maximum can be, for example, about 4-20 pages, or preferably about 8-15 pages and most preferably about 10 pages. The inventive method is flexible, however, and any number of qualifying pages within these ranges or even outside these ranges is contemplated. Thus, exemplary predefined Sessions may be of any length, including, for example, 2, 3, 4, 5, 6, 7, 8, 9, 10, 11, 12, 13, 14, 15, 16, 17, 18, 19, or 20 page view levels, or more, with predefined minimum page views of any or all of these numbers. Maximum page numbers for a Session therefore may include, for example 3, 4, 5, 6, 7, 8, 9, 10, 11, 12, 13, 14, 15, 16, 17, 18, 19, 20, or 21 page view levels, or more.

A page view during the viewer's Session may be skipped for the purposes of the advertising Session if the page chosen for viewing by the user does not qualify by meeting certain predefined criteria for the Session. To qualify as a Session page, the page at a minimum must contain no major advertisement positions occupied by another advertiser and must contain sufficient major advertisement positions to meet the predefined needs of the Session advertiser. Additional skipping constraints also may be defined as the advertiser or web publisher wishes. For example, if a user accesses a page outside the web site subscribing to the inventive advertising method, such a page would not contain Session advertising, would not qualify and would not be counted as part of the Session. In addition, there may be pages viewed on the web site which do not contain a fixed position for the advertising format type which is scheduled to appear on the next viewed Session page. In such a case, the scheduled advertising would not appear or would not fully appear, and the page would not qualify as a Session page for the purposes of counting toward the minimum number of pages or for reporting of impressions to the user viewing that page.

For example, if a top and bottom banner/skyscraper combination is scheduled to appear on the next session page, but the next page chosen by the viewer does not contain a banner position, or if a big ad is scheduled to appear but the next viewed page does not contain a major advertising unit, this page viewed by the user would not qualify as a Session page. Also, in some cases, a different advertiser may already have purchased a fixed position advertisement in one of the major advertisement positions of a page chosen by the viewer. On these pages, the advertiser subscribing to the inventive advertising method would not have exclusive control over the advertising on that web page. Therefore, that viewed page also would not qualify as part of the advertising Session. If a page in the Session is skipped within the web site, the Session would resume where the user left the session the next time the user accesses a web page that does not contain any of the skipping criteria constraints.

Defined criteria for skipping a page view can include but are not limited to any or all of the following:
1. A fixed position advertiser is scheduled to the page in one of the major advertisement positions, for example exclusive sponsorships such as advertisers which have purchased all ads in a particular area of the web site;
2. There are banner positions on the page but no skyscraper position, or vice versa.
3. There are no major advertising units on the page.
4. The page selected is outside the domain of the participating web site(s), for example a microsite accessible from the Session page.

If a page is skipped within the web site, the Session resumes the next time the viewer selects a qualifying web page. Alternatively, the Session may terminate if the viewer selects a page outside of the participating web site, although it may resume immediately upon the viewer's return.

Figure 2:
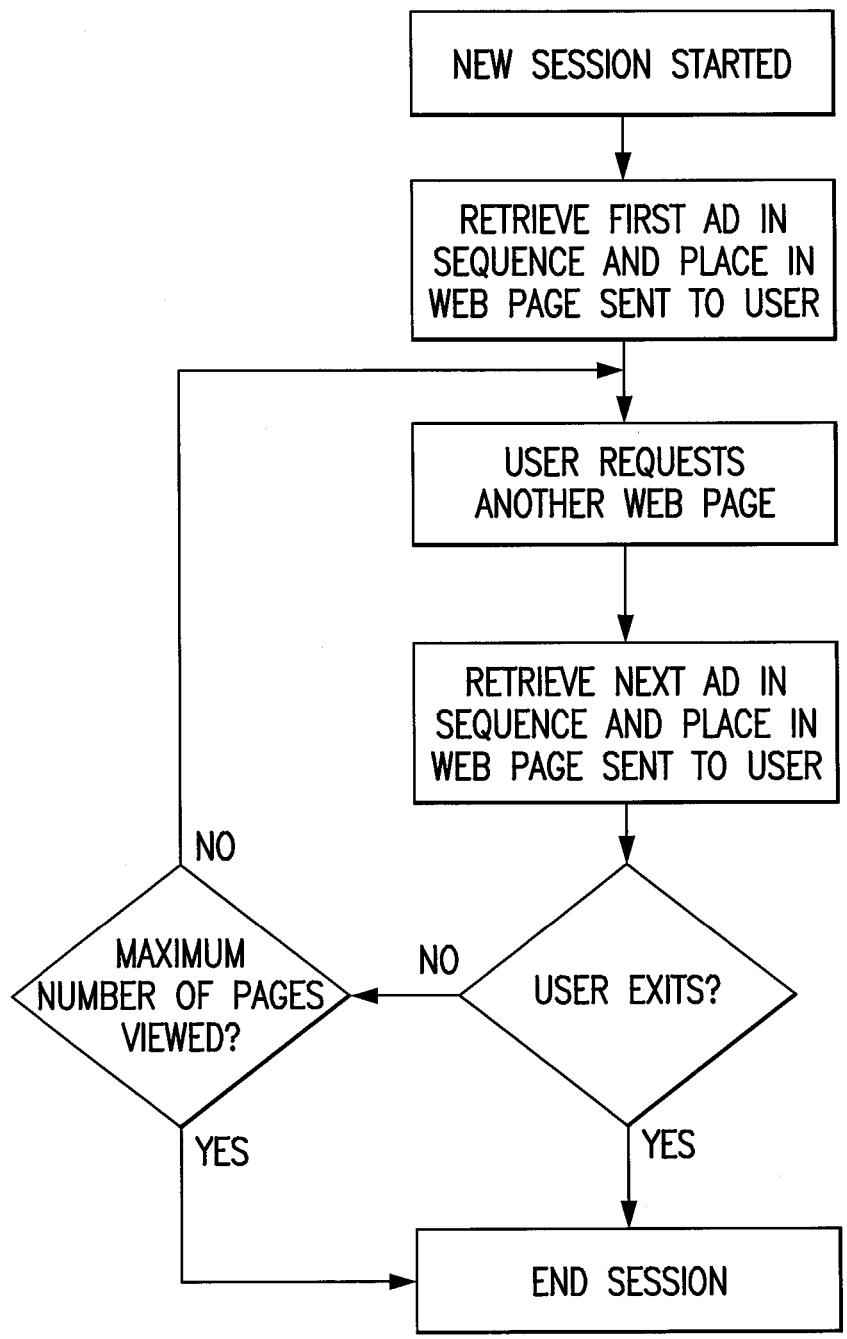
FIG. 2 is a flow chart showing implementation of an exemplary Surround Session™ according to the invention.

In a typical Session, as shown in FIG. 2, on the first page of the Session (Step 21) the page displays advertisements, for example top and bottom banners and/or a skyscraper advertisement, all containing complementary advertisements from one advertiser (Step 22). The user clicks to a second web page within the site, and the Session continues (Step 23). The banners and skyscraper on this second Session page contain the same or new advertisements from the same advertiser, as determined by the next advertisement in the stored sequence (Step 24). The positions of the advertising material on the page may change or may remain the same. If the user exits the web site (Step 25), the Session ends (Step 26). The Session also will be terminated if the user has viewed the maximum number of pages for which sequential Session advertisements are stored (Step 27). If neither of these conditions obtains, the process returns to Step 23. The user selects a third page within the same web site and a third configuration of advertisement location and/or advertisement content is displayed to the user. If the predetermined minimum number of pages is viewed, the advertiser is charged for a Session. If not, the advertiser has not received a Session and would not be charged.

Alternatively, the user may select for viewing a first web page beginning a Session but select a second page which does not meet the criteria to qualify as part of a. Session. This second page would not count toward the minimum number of pages comprising a Session. If the user selects a third page and the selected page qualifies, this page is the second Session page. Each time the user selects a page meeting the criteria for qualification, a Session page is counted toward the minimum number of pages. If the minimum number is reached, the advertiser is charged for a Session. Pages above the minimum (and below the maximum, if any) are delivered without any additional charge. Page views (Session pages) in a site visit that does not meet the minimum also are delivered without charge to the advertiser. If a maximum number of pages has been predetermined and that number is reached, the session is terminated. At that point, a new Session may begin, if desired.

Sessions advertising may be sold on the basis of "run-of-site" Sessions, "contextual" Sessions, "demographic" Sessions or "behavioral" Sessions. For example, in a "run-of-site" Session, the Session begins when a user clicks onto the home page or any other predetermined page of a web site. The advertising presented to the user is not targeted to the user's viewing patterns or demographic characteristics or particular areas of interest. This kind of Surround Session begins as soon as the viewer accesses the designated page, without reference to the viewer's identity. Contextual Sessions target viewers of particular pages of the web site. For example, an advertiser can specifically reach viewers interested in international news or perhaps golf. In this case, the beginning of the Session may be delayed until the user selects a second page on the web site rather than the home page. If the Session begins only after a user has moved to a second page, the advertiser or the subject of the advertisement to be displayed to the user may be chosen either randomly ("run-of-site" Session) or on the basis of the area of the web site chosen by the user ("contextual" Session). Both demographic and behavioral Surround Sessions identify viewers based on biographical or viewing history information and target the advertising accordingly.

Therefore, in a preferred embodiment of the inventive method, advertisements more likely to be of interest to the user can be chosen, so that a session can be tailored to a particular interest of a user or a class of users. For example, an advertiser of automotive supplies or automobiles may wish to purchase Sessions with users who first visit an area of a web site directed toward automobiles. If a user chooses to visit an area of the web site relating to financial matters, an advertising Session devoted to matters relating to investments or financial services may be triggered. Alternatively, advertisements may be targeted to particular viewers based on demographics pulled from site registration data contained in cookies (a "demographic" session) or based on the user's past choices on the web site or on other linked web sites ("behavioral" session).

Figure 3:
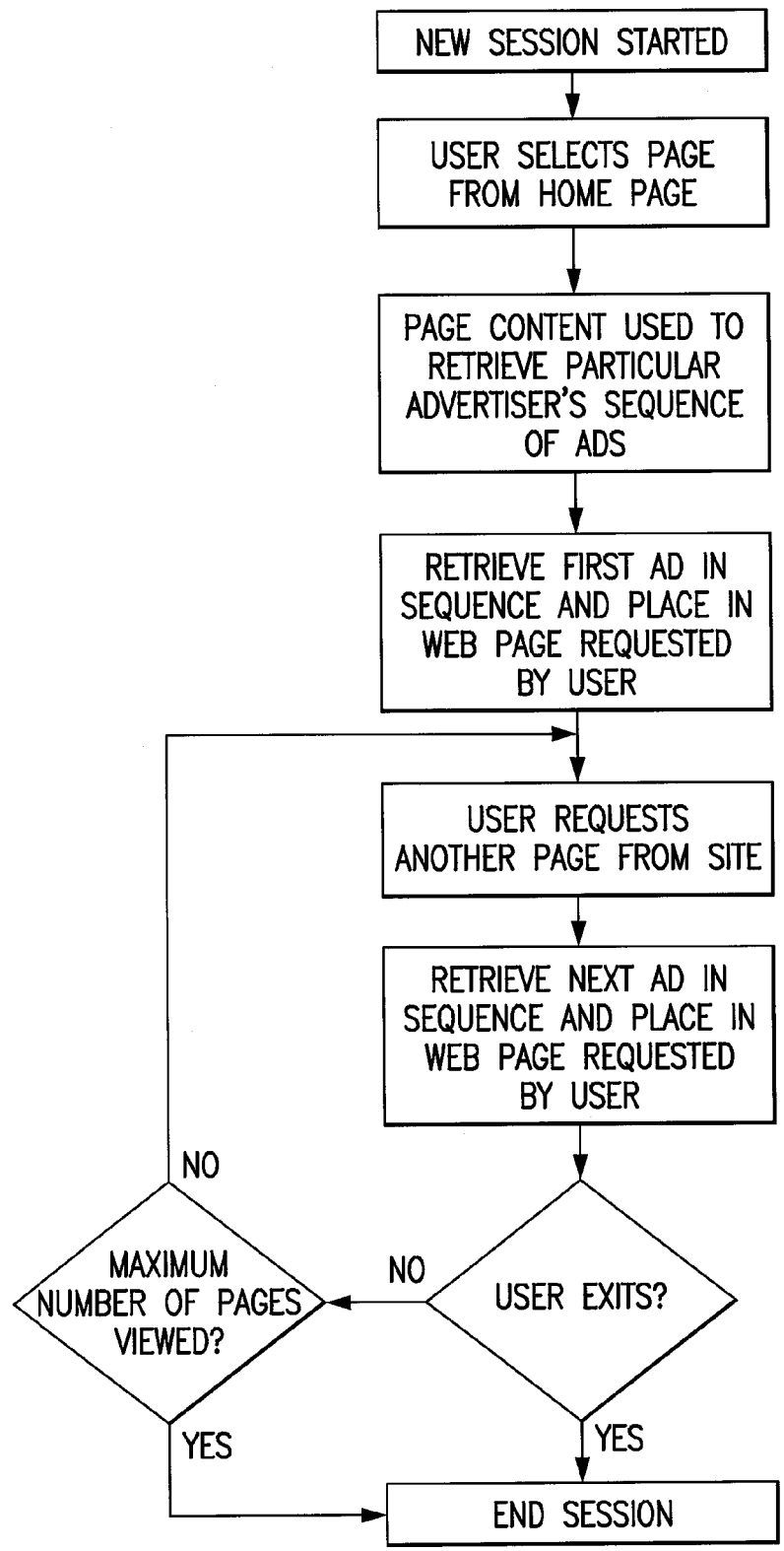
FIG. 3 is a flow chart showing implementation of a preferred Surround Session™ according to the invention.

In a preferred embodiment of the invention, as shown in FIG. 3, at the start of a new Session (Step 31) a viewer would visit the home page of a web site such as nytimes.com, a news and information web site. The Session would begin when the user selected a first page to view from the home page (Step 32). For example, the user may choose to visit a business section, a science and technology section, an international news section, or any section of the web site. A "contextual" Session would begin when the user makes a selection, and the advertising presented to that user can correspond to the user's interests (Steps 33 and 34). For example, particular advertisers may choose to purchase Sessions only with users who evidence an interest in financial matters and investments by choosing to visit the business section first. Once the Session has begun, however, the advertiser follows each user to different sections of the web site regardless of content. Steps 35-39 are similar to the corresponding steps shown in FIG. 2.

Where the web site requires users to register before accessing the site, it is possible to measure and track unique site users across multiple Sessions on the same or different web sites so that the advertiser can obtain data on how many unique users have viewed a particular advertising message or to ensure that a particular user does not receive identical advertisements repeatedly. Identification of unique users also can provide helpful information to marketing directors, media planners and other managers by allowing a calculation of the average frequency that the target audience is reached. Preferred embodiments of the present invention include tracking of individual users for one or both of these purposes.

A user registration database may be used to identify site visitors with particular demographics or particular interests for targeting particular advertising campaign groups to them when they enter the site (a "demographic" Session). Optionally, entry to web sites using the inventive method may be conditioned upon registration, providing certain demographic or other information. Advertising may be targeted based on data such as address, telephone number or zip code, the time of day the site is accessed, the past viewing behavior of the user, or any other information known about the user such as age, gender, occupation or income.

Typically, brand advertisers have not embraced online advertising for the reason that the commonly used types of Internet advertising do not allow purchase and measurement of advertising in a familiar way so that comparisons with other familiar forms of advertising can be made and the success of the advertising can be judged. Although online advertising has been shown through surveys to increase brand awareness and favorability, as well as to influence purchase decisions, and generally is less expensive than other forms of advertising such as broadcast media or traditional print advertising, many advertisers do not advertise online because of perceived difficulties in valuing the advertising impact. The inventive method takes advantage of the correlation between branding value and frequency to create an advertising product that is more compelling to the types of advertisers that have less experience with online advertising.

The advertiser, when purchasing a Session, is assured that the advertisements are being displayed to a user in an uncluttered environment and repeated sufficiently so that the viewer almost certainly will notice the advertisement. The inventive method allows online advertising to be measured in a way such that it can be easily compared to traditional forms of advertising, in terms of duration and reach. With the inventive methods, however, online advertising may be compared to conventional advertising in an "apples-to-apples" manner. Feedback comparable to conventional offline advertising methods is available to allow the effectiveness and relative effectiveness of the purchased advertising to be assessed.

Session advertisements may be sold in units of sessions or in blocks of larger numbers of sessions with the price based on considerations such as the average number of page views expected for each session, the number of minimum or maximum page views for each session, or the areas of interest or the demographic or behavioral qualities of the target audience drawn by the web publisher or web site selling the sessions. Sessions may be priced, for example, according to the time of day. In this embodiment, a Sessions advertiser may purchase Sessions with every visitor to access the site during a particular time period, obtaining guaranteed reach to those persons. Advertisers may pay a flat fee per Session or block of Sessions, depending upon the length of the Session. Although the cost generally is greater than the cost of obtaining an equivalent number of impressions of conventional online banner advertising, the advertising value is much higher. Blocks of Sessions may be sold in units of, for example, 1000; 5000; 10,000; 50,000; 75,000; 100,000; 150,000; 200,000 or more, as is convenient.

Advertisers may also be charged for Sessions in combination with a pricing scheme based on clicks, on conversions or on orders. Viewers of Sessions can be tracked after exposure to the advertising. For example, a cookie may be set for exposure according to any method known in the art so that later online purchases of the advertised product can be measured.

Selling advertising under the inventive method in units of Sessions rather than in units of impressions or by number of clicks also provides a great advantage. Sessions advertising brings measurement of online advertising closer to the reach and frequency model used in traditional media. Rather than measuring advertising on "impressions" or "clicks," which have been discredited in the industry as unreliable and difficult to quantitate, the inventive method allows advertising clients to purchase user Sessions, which are, in effect, units of time with a particular audience. Thus, advertisers using the inventive method are informed by the same type of data that has been used successfully in broadcast and print advertising.

This greatly simplifies the purchasing process and makes online advertising more palatable and more understandable to potential clients, even advertisers that normally would not consider advertising online. The inventive advertising method therefore provides more value to both the advertiser and to the publisher from which the advertising is purchased, while reaching a targeted audience, preferably according to contextual, demographic or behavioral information. The inventive method additionally allows a web site or web publisher with a high quality audience or an audience with a particularly desirable demographic to guarantee to potential advertisers reaching that audience in a highly effective manner. Therefore, the advertising may be sold at a premium price, increasing potential revenues for web publishers. The inventive method therefore will be most attractive to web sites and web publishers which already have attained a high degree of status, trust and reputation, which have loyal readers who spend a relatively large amount of time on the site or long periods of time during a particular web session, or who are able to attract an audience with a particularly desirable demographic.

The inventive method of advertising is able to build brands through repetition of a message to a measurable target audience for a guaranteed time, creating an optimal story-telling environment to capture the attention of the viewer. The method also provides advertising units which are comparable to traditional advertising units and which are easy to understand and quantitate in terms of reach, time and audience. Frequency is a key factor in developing brand recognition and awareness. The inventive method takes advantage of this phenomenon by following a particular user with multiple advertisements throughout a web session. With an advertising session that lasts through several web pages for each session, the exposure of the user to the advertising message approaches or exceeds that seen in a traditional television 30 second spot or consecutive right pages in a print magazine.

Purchasing a session allows the advertiser to reach one user consistently with his message, similarly to a television or radio advertisement. In addition, isolation and repetition of the message throughout the session is more valuable to an advertiser than merely placing a single fixed advertisement on a web site and relying on impressions or clicks to gauge its value. Sales of the advertising are based on the audience (and the quality of the audience) rather than "impressions," and thus can be compared to other advertising media, enabling the advertiser to more easily include online advertising as part of an overall media plan. Thus, the inventive method gives advertisers a product that is more like traditional media in both pricing and its ability to provide reach and sequential advertising that tells a story.

In the past, web sites that have attained a quality audience who repeatedly return to the site and spend time on the site on a regular basis or who have been able to attract an audience with a particular desirable demographic have not been able to take advantage of this fully by leveraging this quality product into advertising income. The Sessions method allows web publishers to capitalize on the user loyalty they have acquired. Sessions advertising has the added benefit to the web site or web publisher of having advertising appear on underutilized sections of the web site where purchasers of fixed advertisements typically may not choose to be positioned, since the advertisements which form a Session appear wherever the user moves within the site, including these underutilized sections.

In summary, the inventive method for advertising allows direct comparison of online advertising with traditional broadcast or print advertising and creates a clutter-free environment for the advertiser to make a long-lasting impact on the viewer through sequential advertisements that tell a story. Frequency is high due to repetition within the session and actual rather than estimated measurements of the delivery of the message are possible because the session format provides a very high likelihood that the advertising message will be received. The invention creates a high value product for advertisers which also provides advantages to the web publisher in increasing the potential advertisers that will be attracted to its site. Benefits to the advertiser accorded by the inventive method include direct response, branding, frequency, exclusivity, measurement and value.

In a preferred embodiment, the web site or web publisher can provide advertising clients with feedback and other information that will allow them to measure the effectiveness of the advertising Sessions in terms of, for example, favorable impression, purchase intent and/or message recall. This information may be provided as part of the Sessions advertising, included in the price, or may be provided as an add-on to the Sessions advertising for an additional charge. Branding impact surveys (branding metric reports) such as those available from Dynamic Logic™, Millward Brown IntelliQuest™ and the like advantageously may be made available to Sessions advertisers to provide information on how effectively the advertisements impact the users of the site.

Information optionally provided to purchasers of sessions advertising may include, but is not limited to: the number of impressions per session; the number of click-throughs per session; the number of page views per session; the number of sessions per day; the average length of sessions; the average number of sessions; the page where the session started; the number of exposures before clicking on an advertisement; interaction measurements (usually associated with rich media advertisements) and the like. For ease of reporting, an impression preferably is recorded as one unit delivered per qualifying Session page, so that impression delivery values equal qualifying Session page views delivered.

Further reports which may be provided to Sessions advertising purchasers include but are not limited to the following reporting metrics:

(1) brand awareness (the level of familiarity respondents have with the brand);
(2) brand favorability (the extent to which respondents have a positive or favorable opinion of the brand);
(3) likelihood of purchase (the likelihood of respondents to purchase the brand in the future);
(4) message recall (the extent to which respondents are able to recall the copy or messages in the advertisement);
(5) message association (the extent to which respondents can match the copy or messages in the advertisement to the brand);
(6) yes/no segmentation question (custom question with yes-or-no answer);
(7) open end segmentation question (custom question with open-ended answer);
(8) advertisement recall (the extent to which respondents are able to recall the advertisement); and
(9) message impact (the extent to which respondents are able to recognize an advertisement from the Session).

To implement the inventive methods, the advertising client provides advertising units in banner, skyscraper, big ad (such as large rectangle) formats, or any format which conveniently fit into all the major advertising units on the pages of the web site. Preferably, the client provides banner (for example, 468× 60), skyscraper (for example, 160×800) and big ad (for example, 336×800) dimensions for each of the page views of the session. Preferably, sufficient different advertising copy is provided so that each page view of a session of average length contains varied copy, although individual advertisements may be repeated or recirculated within a session. In the preferred embodiment of the inventive method, the advertising occupies all of the major advertising positions on the Surround Session pages.

Preferably, advertisements in every size which may potentially be used in a Session (e.g., in the preferred embodiment, banner, skyscraper and big ad), are scheduled for each page view in a session. In that way, advertisements are available for display in all major advertising positions on every page, no matter which page the viewer selects to view at each level. The advertisements may be displayed in a particular order to facilitate the advertiser's message, or at random throughout the session.

When scheduling the campaign management system, advertisers can specify if the same advertisements can appear on multiple page view levels, if different advertisements must appear, and, if applicable, the order in which they must appear. Usually, within each campaign, banners and skyscrapers are set to appear together on a page and big ads are set to appear alone on a page. Then, the campaigns are named in a common format and associated together as a single campaign group representing the full Session for reporting purposes.

A Session is composed of multiple qualifying page views as described above. Each campaign displayed in the Session is accorded a numerical value corresponding to the order in which it is to be viewed in the Session. Thus, the advertisements provided by the advertising client are grouped into numbered campaigns scheduled to be displayed with matching numbered qualifying pages to form a Session. Preferably, a cookie issued by a sessions-configured ad-server is set with the advertisements of the first campaign that serve the first qualifying page view of the Session. The next set of advertisements serve only to users who have viewed the first page of a session and therefore have that cookie. This second set of advertisements is set to increment that cookie. Subsequent sets of advertisements for subsequent page views are set to increment successive cookies and also serve only to users who have the cookie incremented at the appropriate page view level value. For example, the set of advertisements that serves the second campaign in a session would serve only to users who have a cookie value of 1 (one). Then that page view set would increment the user's cookie to 2 (two), and only the set of advertisements scheduled to appear as the third campaign in a session would show to users with that cookie value. A frequency cap preferably is included to cause each page view level to serve to the viewer no more than a set maximum number of times. Alternatively, a Session or a Surround Session™ may be served based on a user IP but this method is inherently less accurate than cookies.

A suitable ad server includes a campaign manager tool, which is the interface through which campaigns are scheduled, a delivery engine, which reads the scheduled information and delivers advertisements accordingly and a reporting tool, which reports delivery results. No special configuration is required to enable a system to deliver session-based campaigns. In the preferred embodiment, the only requirement is that the ad server have the ability to target by cookie value, which is a standard component of most systems of the prior art and is well understood by persons of skill.

The method also has the advantage that it is easy to implement using existing technology and does not require any new or additional hardware systems. For example, standard Interactive Advertising Bureau (IAB) formats may be used with currently available ad-serving technology. Thus the inventive methods create a highly valuable advertising strategy and environment without requiring specialized hardware, software or specialized advertising formats. The frequency cap functionality of an ad server, which allows one to set a maximum number of times the ad will be served is advantageously set to one (1) so that the page of ads representing one campaign or one page view level is served one time. Thus, when the cap expires (the maximum of one time served is reached) the system sets another cookie so that the next page serves only once. Thus, in the preferred embodiment, cookie one expires after the first ad campaign is served to the viewer once, cookie two is set, cookie two expires after the second campaign is served, cookie three is served, etc. The first campaign sets a cookie to the user and each subsequent campaign, using a cookie finder, serves to someone who has that cookie. Since the frequency cap preferably is set at one, the first campaign does not serve twice. Rather, the second campaign serves and issues a second cookie.

The sets of advertisements forming a group of campaigns from the single advertiser follows an individual web site visitor for as long as he continues to access qualifying web pages on the site or sites participating in the Sessions advertising method, or up to a predetermined maximum. If the user continues to select qualifying web pages for viewing after all the page views (campaigns) of the Session already have been viewed, the Session may be set to terminate at that point. Session-based advertising may be terminated before the close of a user's browser session, for example by using the cookie set to sequence the campaigns for frequency capping. When scheduling the campaign delivered as the predetermined last page in a Session, this campaign is set to be served to a user only once, and the cookie is not incremented to a higher value, therefore, when the penultimate cookie has expired, no further campaigns are served. Alternatively a Session may be reset to begin at the first page view level, also using cookies.

A session cookie may be used to identify a web site visitor for delivery of Session advertising. In general, session cookies operate during the time the user's browser is open. For purposes of targeting Session advertising as described above, the session cookie advantageously contains a session name unique to the Session campaign to be delivered, as well as a value indicating to which page view level the Session viewer has been exposed. Cookies in general, and such session cookies are well known in the art, therefore the person of skill would readily understand how to configure and set cookies to target a particular user or a class of particular users which can be uploaded as part of the advertising campaign which forms a page view level. The JavaScript code below is a general example of one method to set a session cookie in this fashion (or to update a session cookie) where NAMEOFSESSION indicates the name given to the set of campaigns which will form the Session, NUMBER indicates the number of the page view that the cookie accompanies and DOMAIN.COM indicates the domain of the web site in which the Session is to take place (and preferably also the domain of the ad server). This code may be appended to the code which serves the particular advertisement copy to each page view.

```
<SCRIPT LANGUAGE = "JavaScript">
// <!--
document.cookie = 'NAMEOFSESSION=NUMBER; path=/;
domain=.DOMAIN.COM'; window.onerror=null;
// -->
</script>
```

For example, to identify an image file (advert.gif) as the first advertising copy to be served in a Session (BrandX), the following code could be used in the context of a prior art ad server (OpenAdStream™). Persons of ordinary skill in the art would be able to modify the code to correspond to the needs of their particular system and ad server, however, therefore the example below should not be seen as limiting the invention.

```
<A
HREF="%%SERVER%%/RealMedia/ads/click_lx.ads/%%PAGE%%/%%RAND%%/%%POS%%/
%%CAMP%%/%%IMAGE%%/%%USER%%" target="%%TARGET%%"><IMG
SRC="%%SERVER%%/RealMedia/ads/Creatives/%%CAMP%%/advert.gif" %%DIM%%
ALT="%%ALT%%" %%HTML%% BORDER="0">%%TEXT</A>
<SCRIPT LANGUAGE = "JavaScript">
// <!--
document.cookie = 'BRANDX=1; path=/;domain=.DOMAIN.COM';
window.onerror=null;
// -->
</script>
```

The variables "NAMEOFSESSION," and NUMBER are changed as necessary to indicate different Session campaign groups and different page view levels, respectively. Cookie targeting then can be used to target site users who have received the cookie NAMEOFSESSION=1 to receive the advertising copy associated with the second page view, which would have appended the above code (but setting a cookie NAMEOFSESSION=2).

The first campaign does not need to be targeted, since it is this campaign with which the session cookie is set. This initial campaign may be scheduled to a certain page (for example in a "contextual" Session) or multiple pages (for example in a "run-of-site" Session) or any page or combination of pages desired by the Sessions advertiser. Subsequent campaigns generally do not require any targeting in addition to the cookie targeting and preferably are scheduled to be served to the Session viewer at all times or to all pages which do not contain fixed advertisements or otherwise do not meet the predetermined criteria for a Session page. Therefore, the "weight" generally is set to a very high number (e.g. 99,999,999) so that the Session campaign is served to the Session advertising viewer across all pages of the web site exclusively. Companion positions can be used according to any method well known in the art to serve the advertisements which comprise the campaign to all the advertisement positions on the particular page.

EXAMPLES

Example 1

Surround Session™

Advertisements units were provided in banner (468×60), skyscraper (160×800) and big ad (336×800) dimensions for each of the page views of the Session, directed to their product referred to here as Brand X. Sufficient advertisements were provided to occupy all major advertising units in a maximum session length of ten page views. The advertisements were produced and designed to be displayed in a particular order to facilitate the advertiser's message. All the advertisements were organized into campaigns and were associated with one or more page view levels. The campaigns were named in a common format and associated together as a single campaign group representing the full Session. Banner and skyscraper advertisements were set to appear together on a page and big ads were set to appear alone on a page.

Each campaign in the Session was accorded a numerical value corresponding to the order in which it was to be viewed in the session. Thus, the advertisements provided by the advertising client were scheduled to form a Session of campaign groups for viewing on each page view selected by the viewers. A cookie issued by a sessions-configured ad-server was set with the advertisements that were scheduled to serve the first page view of the Session (the first Session page) and set with a cookie value "surround session=1." The next set of advertisements (the second campaign of the Session) was served to users who had viewed the first page of the Session and therefore had the cookie set to "surround session=1" and was set to increment that cookie to "surround session=2." Subsequent campaigns for subsequent page views were displayed to viewers having a Surround Session™ cookie incremented to the appropriate values and the successive cookies were incremented up to a limit of ten pages. The campaigns from the single advertiser followed individual web site visitors for as long as they continued to access qualifying web pages on the site, up to a maximum of ten pages, at which time the Session was terminated. Completed Sessions were defined as the number of fifth level page views delivered to users who were served the Session-based advertisements.

Criteria to skip a page within the session were defined. If the page selected by a viewer met one or more of the following defined criteria, the page did not qualify as a Session page and was skipped: (1) there was a fixed position advertiser scheduled to the page in one of the major advertisement positions; (2) there were banner positions on the page but no skyscraper position, or vice versa; (3) there were no major advertising units on the page. If a page was skipped, the Surround Session™ was resumed at the point where it was paused the next time a qualifying page was selected by the viewer. The session was terminated if a page outside the domain of the web site was selected.

Surround Sessions™ were carried out over a period of three days and the reports below were prepared. In this example, the average exposure of each viewer to the displayed advertisements was greater than two minutes. This far surpasses the duration of other conventional advertising methods such as 30-second television spots, or various forms of print advertising.

Surround Sessions™ Report
Advertiser: House Test
Guaranteed Sessions: 80,000
Full Session Impressions (Fifth Level Page Views) Delivered: 89,428. Total Clicks (all clicks recorded for any advertisement within the Session campaign set): 707. Total View Time (the amount of time users spent with a browser window actively displaying advertisements from the Session campaign set, capped at 30 minutes if a browser window was left idle): 11,333 hours. Click Rate: 1.0%. Percent delivery (delivered Sessions/guaranteed Sessions): 112%.

| Ad Delivery Information (over three days) | | | |
|---|---|---|---|
| Banner Ad | Page Views | Clicks | Yield |
| No. 3 | 143,439 | 207 | 0.14% |
| No. 2 | 140,497 | 354 | 0.25% |
| No. 4 | 125,614 | 146 | 0.12% |
| total | 409,550 | 707 | average 0.17% |

| Delivery Information by Day | | | |
|---|---|---|---|
| Day | Page Views | Clicks | Yield |
| 3 | 20,170 | 22 | 0.11% |
| 2 | 93,371 | 90 | 0.10% |
| 1 | 105,880 | 226 | 0.21% |
| | Total | 338 | 0.15% |

| Viewers and View Time by Day | | | |
|---|---|---|---|
| Day | Number of Viewers | View Time (min) | View Time/ Viewer (min) |
| 1 | 9206 | 25,705 | 2.79 |
| 2 | 43,128 | 98,450 | 2.28 |
| 3 | 48,228 | 116,515 | 2.42 |

| Section Delivery Information (over three days) | | | |
|---|---|---|---|
| Web Site Section | Page Views | Clicks | Yield |
| Int'l News | 256,557 | 207 | 0.08 |
| National News | 61,200 | 38 | 0.06 |
| World News | 32,879 | 19 | 0.06 |
| Business | 28,890 | 28 | 0.10 |
| Science/Health | 21,323 | 24 | 0.11 |
| Other | 18,851 | 41 | 0.22 |
| Sports | 14,758 | 12 | 0.08 |
| Technology | 14,375 | 2 | 0.01 |
| Politics | 13,375 | 10 | 0.07 |
| Science | 11,528 | 11 | 0.10 |
| Total | 567,263 | 477 | 0.08 |

Example 2

Branding Metric Reports

Surround Sessions™ were carried out as described in Example 1, containing advertising copy for a different brand and product. The branding metric reports below were prepared by Dynamic Logic™ based on data collected in these Sessions.

Effectiveness Reports

All reports provide data from a sample size of 637 viewers exposed to a Surround Session™ advertisement and 372 control viewers. Impact (I) is calculated as follows I=(exposed−control)/control.

1. Summary Report

| | Exposed | Control | Difference | Impact |
|---|---|---|---|---|
| *Brand Awareness | 73% | 63% | +10% | 16% |
| Brand Favorability | 55% | 52% | +3% | 6% |
| Purchase Intent | 36% | 35% | +1% | 3% |
| *Message Association | 21% | 15% | +6% | 40% |

*Statistically significant difference between control and exposed group at a 90% Confidence Level.

2. Brand Awareness Report

| Respondent Description | Exposed | Control | Impact |
|---|---|---|---|
| All Respondents | 68% | 61% | 12% |
| Male | 70% | 63% | 11% |
| Age 35-49 | 74% | 58% | 27% |
| Age 50+ | 70% | 59% | 19% |
| HHI $75,000+ | 75% | 61% | 23% |
| Would not consider buy from X | 64% | 50% | 28% |
| Very Likely, to Purchase Sportswear | 84% | 77% | 9% |
| Somewhat Likely to Purchase Sportswear | 76% | 62% | 22% |
| Female HHI $40,000-$75,000 | 65% | 49% | 34% |
| Female 35-49 | 68% | 57% | 18% |
| Female & would not consider buy from X | 58% | 41% | 41% |
| Male 35-49 | 76% | 59% | 28% |
| Male 50+ | 73% | 59% | 25% |
| Male 35+ | 75% | 60% | 26% |
| Female 35+ | 66% | 56% | 17% |
| Male 18-49 | 70% | 64% | 10% |
| Female HHI $40,000+ | 67% | 56% | 20% |
| Frequency 1x | 67% | 61% | 11% |
| Frequency 1-2x | 66% | 61% | 9% |
| Frequency 3x | 71% | 61% | 17% |

3. Message Association Report

| Respondent Description | Exposed | Control | Impact |
|---|---|---|---|
| All respondents | 18% | 13% | 38% |
| Female | 24% | 16% | 56% |
| Age 18-24 | 20% | 14% | 41% |
| HHI $0-$40,000 | 20% | 10% | 103% |
| HHI $40,000-$75,000 | 21% | 14% | 51% |
| Would not consider buy from X | 12% | 5% | 166% |
| Not likely to purchase a sports car | 14% | 8% | 67% |
| Female HHI $40,000-$75,000 | 30% | 15% | 97% |
| Female 18-34 | 26% | 12% | 108% |
| Female HHI $0-$40,000 | 22% | 10% | 117% |
| Frequency 1x | 17% | 13% | 35% |
| Frequency 2x | 18% | 13% | 41% |
| Male 35+ | 13% | 8% | 61% |
| Female HHI $40,000+ | 26% | 18% | 48% |

4. Purchase Intent Sample Report

| Respondent Description | Exposed | Control | Impact |
|---|---|---|---|
| Male 50+ | 38% | 25% | 55% |
| Female 35-49 & HHI $75,000+ | 39% | 21% | 86% |
| Age 35+ & HHI $40,000+ | 35% | 29% | 21% |

Example 3

Surround Session™ Reports

A Surround Session™ was carried out as described in Example 1, containing advertising copy for a different brand and product (Brand Y). The following reports were generated.
Surround Sessions™ Report
Advertiser: Brand Y
Guaranteed Sessions: 75,000
Full Session Impressions (Fifth Level Page Views) Delivered: 84,911. Total Clicks (all clicks recorded for any advertisement within the Session campaign set): 5317. Total View Time (the amount of time users spent with a browser window actively displaying advertisements from the Session campaign set, capped at 30 minutes if a browser window was left idle): 178,550 hours. Average View Time per Viewer: 11.18 minutes. Percent delivery (delivered Sessions/guaranteed Sessions): 113%.

| Ad Delivery Information (over 17 days) | | | | | |
|---|---|---|---|---|---|
| Campaign | Page Views | % of Total | Clicks | % of Total | Yield |
| 1 | 375,733 | 29.92% | 2611 | 49.11% | 0.69% |
| 1a | 15 | 0.00% | 2 | 0.04% | 13.33% |
| 2 | 193,519 | 15.41% | 823 | 15.48% | 0.43% |
| 3 | 148,863 | 11.86% | 550 | 10.34% | 0.37% |
| 4 | 117,156 | 9.33% | 389 | 7.32% | 0.33% |
| 5 | 84,911 | 6.76% | 254 | 4.78% | 0.30% |
| 6 | 64,509 | 5.14% | 160 | 3.01% | 0.25% |
| 7 | 45,886 | 3.65% | 142 | 2.67% | 0.31% |
| 8 | 36,248 | 2.89% | 70 | 1.32% | 0.19% |
| 9 | 28,159 | 2.24% | 52 | 0.98% | 0.18% |
| 10 | 160,615 | 12.79% | 264 | 4.97% | 0.16% |
| Total | 1,255,614 | 100.00% | 5317 | 100.00% | average 0.42% |

Delivery Information by Day

| Day | Page Views | % of Total | Clicks | % of Total | Yield |
|---|---|---|---|---|---|
| 17 | 36,191 | 2.88% | 125 | 2.35% | 0.35% |
| 16 | 33,711 | 2.68% | 132 | 2.48% | 0.39% |
| 15 | 57,468 | 4.58% | 237 | 4.46% | 0.41% |
| 14 | 73,023 | 5.82% | 296 | 5.57% | 0.41% |
| 13 | 82,909 | 6.60% | 339 | 6.38% | 0.41% |
| 12 | 95,429 | 7.60% | 440 | 8.28% | 0.46% |
| 11 | 113,792 | 9.06% | 474 | 8.91% | 0.42% |
| 10 | 87,053 | 6.93% | 379 | 7.13% | 0.44% |
| 9 | 66,986 | 5.33% | 288 | 5.42% | 0.43% |
| 8 | 77,995 | 6.21% | 302 | 5.68% | 0.39% |
| 7 | 72,984 | 5.81% | 312 | 5.87% | 0.43% |
| 6 | 72,104 | 5.74% | 298 | 5.60% | 0.41% |
| 5 | 81,895 | 6.52% | 317 | 5.96% | 0.39% |
| 4 | 73,917 | 5.89% | 307 | 5.77% | 0.42% |
| 3 | 84,915 | 6.76% | 397 | 7.47% | 0.47% |
| 2 | 70,241 | 5.59% | 330 | 6.21% | 0.47% |
| 1 | 75,001 | 5.97% | 341 | 6.41% | 0.45% |
| Total | 1,255,614 | 100.00% | 5317 | 100.00% | average 0.42% |

Viewers and View Time by Day

| Day | Number of Viewers | View Time (min) | View Time/ Viewer (min) |
|---|---|---|---|
| 17 | 26,283 | 359,081.73 | 13.66 |
| 16 | 25,364 | 291,836.27 | 11.51 |
| 15 | 43,921 | 477,621.17 | 10.88 |
| 14 | 54,976 | 587,066.10 | 10.68 |
| 13 | 63,742 | 704,067.75 | 11.05 |
| 12 | 73,944 | 760,305.20 | 10.28 |
| 11 | 88,244 | 996,961.58 | 11.30 |
| 10 | 62,630 | 890,995.27 | 14.23 |
| 9 | 49,279 | 638,818.60 | 12.96 |
| 8 | 60,495 | 679,500.83 | 11.23 |
| 7 | 55,912 | 577,511.98 | 10.33 |
| 6 | 56,531 | 556,519.98 | 9.85 |
| 5 | 61,215 | 678,039.05 | 11.08 |
| 4 | 57,565 | 558,017.80 | 9.69 |
| 3 | 62,177 | 797,143.70 | 12.82 |
| 2 | 53,547 | 577,670.45 | 10.79 |
| 1 | 62,282 | 581,844.42 | 9.34 |
| Total | 958,109 | 10,713,001.88 | 11.18 |

Section Delivery Information (over 17 days)

| Web Site Section | Page Views | % of Total | Clicks | % of Total | Yield (%) |
|---|---|---|---|---|---|
| National News | 497,247 | 39.60% | 2,602 | 48.94% | 0.52% |
| Politics | 271,247 | 21.65% | 1,496 | 28.14% | 0.55% |
| Politics (articles only) | 260,574 | 20.75% | 1,457 | 27.40% | 0.56% |
| National (articles only) | 235,760 | 18.78% | 1,395 | 26.24% | 0.59% |
| NY Region | 162,012 | 12.90% | 732 | 13.77% | 0.45% |
| NY Region (articles only) | 145,204 | 11.56% | 682 | 12.83% | 0.47% |
| Movies | 137,152 | 10.92% | 731 | 13.75% | 0.53% |
| Movies (articles only) | 119,275 | 9.50% | 574 | 10.80% | 0.48% |
| Arts | 116,684 | 9.29% | 499 | 9.38% | 0.43% |
| Int'l News | 101,254 | 8.06% | 344 | 6.47% | 0.34% |
| Business | 92,317 | 7.35% | 222 | 4.18% | 0.24% |
| Arts (articles only) | 73,278 | 5.84% | 294 | 5.53% | 0.40% |
| Business (articles only) | 65,739 | 5.24% | 154 | 2.90% | 0.23% |
| Int'l News (articles only) | 65,364 | 5.21% | 237 | 4.46% | 0.36% |
| Science/Health | 51,286 | 4.08% | 196 | 3.69% | 0.38% |
| Sports | 48,810 | 3.89% | 130 | 2.44% | 0.27% |
| Technology | 41,815 | 3.33% | 86 | 1.62% | 0.21% |
| Science | 26,797 | 2.13% | 111 | 2.09% | 0.41% |
| Health | 25,914 | 2.06% | 96 | 1.81% | 0.37% |
| Magazine | 25,356 | 2.02% | 51 | 0.96% | 0.20% |
| Magazine (articles only) | 20,643 | 1.64% | 40 | 0.75% | 0.19% |
| Books | 19,827 | 1.58% | 76 | 1.43% | 0.38% |
| Technology (articles only) | 18,311 | 1.46% | 40 | 0.75% | 0.22% |
| Health (articles only) | 18,142 | 1.44% | 69 | 1.30% | 0.38% |
| AP Online | 17,979 | 1.43% | 37 | 0.70% | 0.21% |
| Science (articles only) | 17,658 | 1.41% | 65 | 1.22% | 0.37% |
| Travel | 12,364 | 0.98% | 35 | 0.66% | 0.28% |
| Circuits | 10,972 | 0.87% | 15 | 0.28% | 0.14% |
| Dining/Wine | 10,421 | 0.83% | 33 | 0.62% | 0.32% |
| Other | 9621 | 0.77% | 41 | 0.77% | 0.43% |
| Travel (articles only) | 9617 | 0.77% | 26 | 0.49% | 0.27% |
| Living | 8670 | 0.69% | 29 | 0.55% | 0.33% |
| Dining (articles only) | 8441 | 0.67% | 24 | 0.45% | 0.28% |
| Education | 7183 | 0.57% | 27 | 0.51% | 0.38% |
| Obituaries | 6741 | 0.54% | 22 | 0.41% | 0.33% |
| Obituaries (articles only) | 6741 | 0.54% | 22 | 0.41% | 0.33% |
| Books (articles only) | 5786 | 0.46% | 19 | 0.36% | 0.33% |
| Sports (articles only) | 4970 | 0.40% | 24 | 0.45% | 0.48% |
| Home/Garden | 4710 | 0.38% | 14 | 0.26% | 0.30% |
| Fashion (articles only) | 4257 | 0.34% | 11 | 0.21% | 0.26% |
| Fashion | 4194 | 0.33% | 11 | 0.21% | 0.26% |
| Home (articles only) | 3163 | 0.25% | 10 | 0.19% | 0.32% |
| Diversions | 2224 | 0.18% | 8 | 0.15% | 0.36% |
| Basketball | 2140 | 0.17% | 4 | 0.08% | 0.19% |
| Cybertimes | 1854 | 0.15% | 4 | 0.08% | 0.22% |
| Home Page (NY Today) | 1406 | 0.11% | 6 | 0.11% | 0.43% |
| NY Today | 1406 | 0.11% | 6 | 0.11% | 0.43% |
| Real Estate (articles only) | 1203 | 0.10% | 4 | 0.08% | 0.33% |
| College Times | 1152 | 0.09% | 7 | 0.13% | 0.61% |

The invention claimed is:

1. An online session advertising method for displaying advertisements to a web site visitor having a computer, the method comprising:
 (a) storing a first group of one or more ad identifiers and a second group of one or more ad identifiers, wherein each ad identifier included in the first group identifies an ad for a first advertiser, each ad identifier included in the second group identifies an ad for a second advertiser that is different than the first advertiser, a first ad group identifier is associated with the first group of ad identifiers, and a second ad group identifier is associated with the second group of ad identifiers;
 (b) receiving, at a server, a first request message transmitted from a browser executing on the computer;

(c) in response to said first request message, transmitting a response to the computer, wherein the response includes (i) a first document that includes an ad identifier from the first group of ad identifiers and (ii) a state information comprising the first ad group identifier;

(d) after step (c), receiving, at a server, a second request message transmitted from the browser in response to the web site visitor activating a hyperlink included in the first document, wherein the second request message comprises the state information; and (e) in response to said second request message, (e1) selecting a set of one or more ad identifiers based, at least in part, on the state information included in the second request message, wherein the selecting step comprises:

(e1.a) determining whether the state information received with the second request message includes the first ad group identifier;

(e1.b) in response to determining that the state information received with the second request message includes the first ad group identifier, determining (i) a maximum page view limit associated with the first ad group identifier and (ii) whether the maximum page view limit has been reached;

(e1.c) choosing a first set of ad identifiers that includes at least one ad identifier from the first group of ad identifiers in response to determining that the state information includes the first ad group identifier and the maximum page view limit has not been reached; and (e1.d) choosing a second set of one or more ad identifiers if the state information does not include the first ad group identifier, wherein the second set of ad identifiers includes zero or more ad identifiers from the first group of ad identifiers; and (e2) transmitting to the browser a second document that includes the selected set of one or more ad identifiers.

2. The method of claim 1, wherein the first document and the second document are hypertext markup language (HTML) documents.

3. The method of claim 1, wherein the first group of ad identifiers comprises a first ad identifier and a second ad identifier, wherein the first ad identifier is associated with a first sequence value that identifies the position of the first ad identifier in a first sequence and the second ad identifier is associated with a second sequence value that identifies the position of the second ad identifier in the first sequence;

the second group of ad identifiers comprises a first ad identifier and a second ad identifier, wherein the first ad identifier is associated with a first sequence value that identifies the position of the first ad identifier in a second sequence and the second ad identifier is associated with a second sequence value that identifies the position of the second ad identifier in the second sequence;

the first document includes the first ad identifier from the first group of ad identifiers; and the response transmitted to the browser causes the browser to store state information comprising not only the first ad group identifier but also a sequence value that is based on the sequence value associated with the first ad identifier.

4. The method of claim 3, wherein the position of the second ad identifier in the sequence immediately follows the position of the first ad identifier in the sequence;

the state information included in the second request message includes the first ad group identifier and the sequence value that were stored by the browser the first ad group identifier is associated with a maximum page view value; and the step of determining whether the maximum page view limit has been reached comprises comparing the sequence value with the maximum page view value.

5. The method of claim 4, wherein the sequence value stored by the browser equals the sequence value of the first ad identifier.

6. The method of claim 1, wherein said first document is one in which there are no advertisements in any major ad position other than the advertisements included in the first campaign.

7. The method of claim 1, wherein (1) the ad identifier from the first group of ad identifiers included in the transmitted response to the first request message and (2) the chosen at least one ad identifier from the first group of ad identifiers are different ad identifiers and identify different ads for the first advertiser.

8. An online session advertising method for displaying advertisements to a web site visitor having a computer, the method comprising:

(b) receiving, at a server, a first request message transmitted from a browser executing on the computer;

(c) in response to said first request message, transmitting a response to the computer, wherein the response includes (1) a first document that includes an ad identifier from a group of ad identifiers and (2) state information indicating that the first document includes an ad identifier from the group of ad identifiers;

(d) after step (c), receiving, at a server, a second request message transmitted from the browser in response to the web site visitor activating a hyperlink included in the first document, wherein the second request message comprises the state information; and (e) in response to said second request message, (i) selecting a set of one or more ad identifiers based, at least in part, on the state information included in the second request message and (ii) transmitting to the browser a second document that includes the selected set of ad identifiers, wherein the step of selecting the set of ad identifiers comprises determining (i) whether the state information comprises the information indicating that the first document includes an ad identifier from the group of ad identifiers, (ii) whether a maximum a page view limit has been reached, and (iii) whether the document identified by the second request message meets predefined session criteria, and the step of selecting the set of ad identifiers further comprises selecting an ad identifier from the group of ad identifiers in response to determining that (i) the state information comprises the information indicating that the first document includes an ad identifier from the group of ad identifiers, (ii) the maximum a page view limit has not been reached, and (iii) the document identified by the second request message meets the predefined session criteria.

9. The method of claim 8, wherein (1) the ad identifier from the group of ad identifiers included in the transmitted response to said first request message and (2) the selected ad identifier from the group of ad identifiers selected are different ad identifiers and identify different ads for the advertiser.

10. The method of claim 8, wherein the predefined session criteria comprise one or more of the following:

(1) no fixed position advertiser being scheduled to any major advertising position of the second document,
(2) the second document has a particular ad spot or spots available,
(3) the second document has at least one major advertising unit,
(4) the second document is within the domain of the web site or within the domain of other participating web sites, and
(5) the second document is directed towards a particular type of subject matter.

11. The method of claim 8, wherein
the group of one or more ad identifiers comprises a first ad identifier and a second ad identifier, wherein the first ad identifier is associated with a first sequence value that identifies a position of the first ad identifier in a sequence and the second ad identifier is associated with a second sequence value that identifies the position of the second ad identifier in the sequence,
the first document includes the first ad identifier; and
the response transmitted to the browser causes the browser to store state information comprising not only the ad group identifier but also a sequence value that is based on the sequence value associated with the first ad identifier.

12. The method of claim 11, wherein
the position of the second ad identifier in the sequence immediately follows the position of the first ad identifier in the sequence;
the state information included in the second request message includes the ad group identifier and the sequence value that were stored by the browser;
the ad group identifier is associated with a maximum page view value; and
the step of determining whether the maximum page view limit has been reached comprises comparing the sequence value with the maximum page view value.

13. The method of claim 12, wherein the sequence value stored by the browser equals the sequence value of the first ad identifier.

14. An online session advertising method for displaying advertisements to a web site visitor having a computer, the method comprising:
(a) receiving, at a server, a first request message transmitted from a browser executing on the computer;
(b) in response to said first request message, transmitting a response to the computer, wherein the response includes (1) a first document that includes an ad identifier from a set of ad identifiers and (2) state information indicating that the first document includes an ad identifier from the set of ad identifiers, wherein the set of ad identifiers is associated with a first advertiser;
(c) after step (b), receiving, at a server, a second request message transmitted from the browser in response to the web site visitor activating a hyperlink for a second document, wherein the hyperlink is included in the first document, wherein the second request message comprises the state information;
(d) in response to the second request message, selecting a set of one or more ad identifiers to be included in the second document, wherein
the selecting step comprises determining (i) whether the state information comprises information indicating that the first document includes an ad identifier from the set of ad identifiers, (ii) whether a maximum page view limit has been reached, and (iii) whether the second document contains a major advertisement position occupied by a second advertiser that is different than the first advertiser, and
the selecting step further comprises selecting an ad identifier from the set of ad identifiers in response to determining that (i) the state information comprises information indicating that the first document includes an ad identifier from the set of ad identifiers, (ii) the maximum page view limit has not been reached, and (iii) the second document does not contain any major advertisement positions occupied by an advertiser that is different than the first advertiser.

15. The method of claim 14, wherein
the set of ad identifiers comprises a first ad identifier and a second ad identifier, wherein the first ad identifier is associated with a first sequence value that identifies a position of the first ad identifier in a sequence and the second ad identifier is associated with a second sequence value that identifies the position of the second ad identifier in the sequence,
the first document includes the first ad identifier; and
the response transmitted to the browser causes the browser to store state information comprising not only an ad set identifier associated with the set of ad identifiers but also a sequence value that is based on the sequence value associated with the first ad identifier.

16. The method of claim 15, wherein
the position of the second ad identifier in the sequence immediately follows the position of the first ad identifier in the sequence; and
the state information included in the second request message includes the ad set identifier and the sequence value that were stored by the browser.

17. The method of claim 16, wherein the sequence value stored by the browser equals the sequence value of the first ad identifier.

18. The method of claim 14, wherein (1) the ad identifier from the set of ad identifiers included in the transmitted response to said first request message and (2) the selected ad identifier from the set of ad identifiers selected are different ad identifiers and identify different ads for the advertiser.

* * * * *